US007722233B2

(12) United States Patent
Meyrenaud

(10) Patent No.: US 7,722,233 B2
(45) Date of Patent: May 25, 2010

(54) OPTICAL MODULE FOR A MOTOR VEHICLE LIGHTING DEVICE

(75) Inventor: Jean-Luc Meyrenaud, Livry Gargan (FR)

(73) Assignee: Valeo Vision, Bobigny (FR)

( * ) Notice: Subject to any disclaimer, the term of this patent is extended or adjusted under 35 U.S.C. 154(b) by 904 days.

(21) Appl. No.: 11/458,542

(22) Filed: Jul. 19, 2006

(65) Prior Publication Data

US 2007/0019430 A1 Jan. 25, 2007

(30) Foreign Application Priority Data

Jul. 21, 2005 (FR) .................................. 05 07785

(51) Int. Cl.
*B60Q 1/00* (2006.01)
*F21V 11/00* (2006.01)

(52) U.S. Cl. ........................ 362/539; 362/516; 362/520

(58) Field of Classification Search ................. 362/516, 362/520, 538, 539
See application file for complete search history.

(56) References Cited

U.S. PATENT DOCUMENTS

| | | | | |
|---|---|---|---|---|
| 4,686,610 | A * | 8/1987 | Cibie et al. | 362/517 |
| 4,914,747 | A | 4/1990 | Nino | |
| 5,938,323 | A | 8/1999 | McMahan | |
| 6,607,295 | B2 * | 8/2003 | Hayakawa | 362/517 |
| 6,623,149 | B2 | 9/2003 | Leleve | |
| 6,910,792 | B2 * | 6/2005 | Takada et al. | 362/539 |
| 6,997,587 | B2 | 2/2006 | Albou | |
| 2002/0044451 | A1 | 4/2002 | Leleve | |
| 2003/0202359 | A1 | 10/2003 | Albou | |

FOREIGN PATENT DOCUMENTS

| | | |
|---|---|---|
| EP | 0624753 | 11/1994 |
| EP | 1193440 | 4/2002 |
| EP | 1197387 | 4/2002 |
| EP | 1357334 | 10/2003 |
| EP | 1422471 | 5/2004 |
| EP | 1422472 | 5/2004 |
| FR | 2754039 | 4/1998 |
| FR | 2796705 | 1/2001 |
| JP | 7029402 | 1/1995 |

* cited by examiner

*Primary Examiner*—Jason Moon Han
(74) *Attorney, Agent, or Firm*—Jacox, Meckstroth & Jenkins

(57) ABSTRACT

An optical module for a motor vehicle lighting device, capable of emitting at least one type of light beam having a cut-off and comprising: a light source disposed in a reflector; a dioptric element, in particular a convergent lens, disposed in front of the reflector; a shield disposed between said light source and said dioptric element; and an additional optical element is disposed between the light source and the shield.

24 Claims, 4 Drawing Sheets

OPTICAL MODULE FOR A MOTOR VEHICLE LIGHTING DEVICE

BACKGROUND OF THE INVENTION

1. Field of the Invention

The present invention relates to an optical module for a motor vehicle lighting device of the projector type and more particularly, to optical modules referred to as elliptical modules comprising a light source associated with a reflector and closed by a dioptric element of the convergent lens type, for example a plano-convex type lens, or a Fresnel lens. The invention provides optical modules equipped with a fixed or movable shield capable of intercepting at least partially, according to its position, the light beam emitted by the light source/reflector assembly. The shape of the upper edge of the shield makes it possible to delimit the desired cut-off in the beam by imagery with the convergent lens.

2. Description of the Related Art

Besides these well-known lighting and signaling functions, new functions have recently appeared, grouped together under the name AFS (Advanced Front System), which offer in particular other types of beam functions. These functions concern in particular:

- the so-called BL (Bending Light) function, which can be broken down into a so-called DBL (Dynamic Bending Light) function and a so-called FBL (Fixed Bending Light) function. The DBL function makes it possible to modify the orientation of a light beam produced by a light source so that, when the vehicle reaches a bend, the road is illuminated in an optimum manner. The purpose of the FBL function is to progressively illuminate the verge of the road when the vehicle takes a bend; to this end, an additional light source is provided which progressively supplements the low-beam or high-beam lights during negotiation of a bend;
- the so-called Town Light function. This function provides the broadening of a low-beam light type beam whilst slightly reducing its range;
- the so-called Motorway Light function. This function provides an increase in the range of a low-beam light;
- the so-called Overhead Light function. This function provides a modification of a low-beam light beam so that gantries situated high up are satisfactorily illuminated by means of the low-beam lights;

a so-called AWL (Adverse Weather Light) function. This function provides a modification of a low-beam light beam so that the driver is not dazzled by a reflection of his own headlight.

Optical modules with a fixed or movable shield have been used in the past, and reference can be made in particular to several illustrative examples in the patents EP 1 197 387, EP 1 422 471 or EP 1 422 472. The movable shield, on command and by virtue of the presence of a motor, can take different positions with respect to the light source, including at least one position referred to as optically "active", that is to say a position where it effectively masks part of the light beam, in particular so that the module emits a beam with a cut-off, such as a low-beam (oblique cut-off) or fog-lamp (horizontal cut-off) type beam. The shield can thus have one or more "active" positions, for example two, one for the right-hand drive low-beam function and one for the left-hand drive function, and also a so-called "passive" function where it does not mask the light beam, thus allowing the module to emit light beams with no cut-off of the high-beam type. For examples of modules with a fixed shield, reference can be made in particular to the patent FR 2 754 039, which describes modules capable of emitting low-beam or fog-lamp beams for example.

Whether the shield is fixed or movable, and irrespective of the type of cut-off it defines in the beam, it remains that all the luminous flux that is intercepted by the shield is lost, and the luminous efficiency, that is to say the ratio between the light emitted by the lamp and that reconstructed at the output of the optical module, is therefore not very satisfactory.

The aim of the invention is then the development of an optical module with a shield of the type described above, in particular of the elliptical type, which has improved optical performance.

One feature of the invention concerns increasing the luminous efficiency of this type of module without impairing the statutory photometric characteristics of the beams with cut-off obtained. Secondarily, the aim of the invention is to achieve this objective without completely changing the design of current optical modules.

SUMMARY OF THE INVENTION

Another object of the invention is to provide an optical module that does not lose all the luminous flux at the cut-off. In one aspect, an elliptical module, for a motor vehicle lighting device, capable of emitting at least one type of light beam having a cut-off is provided. The module comprises:

- a light source disposed in a reflector;
- a dioptric element, in particular a convergent lens, disposed in front of the reflector;
- a shield disposed between said light source and said dioptric element and having at least one optically active position where it intercepts some of the light rays emitted by the source, the optically active edge of the shield being suitable for forming a cut-off in the beam emitted by the module.

Moreover, an additional optical element is disposed between the light source and the shield, said additional optical element being in the vicinity of the optically active edge of the shield and having at least one reflective surface capable of redirecting, above the optically active edge of the shield, at least some of light rays that normally would have been blocked by the shield are reflected by the additional optical element above said optically active edge of the shield toward said dioptric element and do not contact the shield when said light rays are emitted by the light source toward said shield.

Advantageously, at least one point of the additional optical element is situated between the focus of the dioptric element of the convergent lens type and the reflector: this additional optical element is at least partly, in particular completely, disposed between the source and the shield, or else between the reflector and the shield.

Within the context of the present text, "light rays emitted by the source" means the rays emitted directly by the source and the rays emitted indirectly by the source, namely the rays emitted by the source and then reflected, in particular at least once by the wall of the reflector in which the light source is situated.

The function of the additional optical element is therefore to recover at least part of the luminous flux which otherwise would be intercepted by the shield and therefore lost/wasted. Its design is then chosen so that it can "fold upwards" the rays before they reach the shield, preferably in an appropriate manner so that these rays participate effectively in obtaining the photometry of the light beam with the desired cut-off. This increase in the luminous efficiency of the module can be taken advantage of in various ways:

the aim can be similar optical performance with less powerful light sources and/or less complex reflectors;

the aim can also be optical performance that is better overall, all other things being equal, the gain in light being used to obtain beams that are overall more powerful and possibly having an improved distribution.

Advantageously, the optical module is of the elliptical module type: the source is placed at a first rear focus of the reflector, or in the vicinity thereof, and the dioptric element is placed at the internal focus of the reflector or in the vicinity thereof. The shape of the reflector is then close to an ellipsoid.

The additional optical element can be fixed to or even form an integral part of the shield. Provision can be made to mount the optical element on the shield or the support of the shield by any known fixing means, in particular by clipping, crimping, welding, gluing or overmoulding. The shield (or its support) and this optical element can also be made or formed into a single piece.

The reflective surface of the additional optical element preferably comprises a face turned upwards, the front edge of which substantially follows, at least locally, the profile of the optically active edge of the shield, meaning that the front edge of the element substantially adopts the shape of the edge of the shield. In fact, this choice proved judicious for minimizing the risks of creating fuzziness in the beam emitted by the module in the vicinity of the cut-off.

In the whole of the present text the terms "front", "rear", "top", "bottom", "upper" or "lower" are understood according to the position of the module once integrated if applicable in a headlight and mounted on a vehicle in normal operating mode.

One embodiment consists in that the front edge of the additional optical element is placed next to the optically active edge of the shield.

The reflective surface of the additional optical element comprises a face turned upwards and which is preferably disposed in the vicinity of the central part only of the shield. This configuration in fact makes it possible to recover light rays in the area of the shield receiving the greatest amount of luminous flux: with a remarkable saving of resources (added element of reduced size), a substantial increase in luminous efficiency is therefore already obtained.

The reflective surface of the additional optical element comprises a face turned upwards and provided with an indentation at its rear edge. The indentation can in fact delimit two lateral areas that extend towards the rear in order to further improve the light recovery by "surrounding" the lamp (observing of course a sufficient distance with the lamp).

The front edge of the face in question preferably comprises a broken line, namely a succession of straight line segments, without ruling out possible curved portions also.

This front edge substantially serves, preferably, as a generator for the shape of the face turned upwards mentioned above: it then consists, for example, of a succession of planes inclined with respect to one another aligned substantially along the optical axis of the module.

The rear edge of the face in question preferably has a profile close, or identical, to that of the front edge. It can also have a different profile, curved for example.

This is in particular the case when the face turned upwards comprises a skew surface.

This face is preferably disposed in a substantially horizontal plane and transversely to the optical axis of the reflector, as can be the case for the shield also. Its width then consists of its dimension measured parallel to the optical axis, and its length perpendicular thereto. In this case, its width (its smaller dimension) is at least 8 times, in particular at least 10 times, less than its length (its larger dimension). Its thickness is small. For example, the additional optical element can come in the form of a plate of 2 to 6 mm, in particular 3 to 4 mm, in width, and 35 to 60, in particular 40 to 50 mm, in length. And its thickness can be 0.2 to 1.5 or 2 mm.

Advantageously, and in particular in the skew configuration mentioned above, this face is convex along its length/its larger dimension, with for example a rise at the centre of the order of 0.5 to 4 mm, in particular 1 to 2 mm. The convex shape (upwards) is advantageous for contributing towards providing good linearity of the cut-off of the light beam. It can contribute towards compensating for any optical defects inherent in the reflector or the dioptric element.

According to one embodiment, the reflective surface of the additional optical element comprises a face turned upwards which is smooth. According to another embodiment, it comprises, at least locally, ridges and/or undulations and/or flutes. These surface modifications give an additional possibility of controlling the distribution of the recovered rays in the beam emitted by the module: they make it possible in particular to spread the beam. They can be distributed over the entire reflective surface, including the lateral areas mentioned above.

The ridges and/or undulations are preferably substantially oriented parallel to the optical axis of the module. The ridges and/or undulations can be evolutive in shape, more particularly when the face turned upwards referenced above is flat. Evolutive ridge means a ridge whose starting profile and finishing profile are different. The front profile starts at the optically active edge of the shield (which is generally straight), and the rear profile is a radius or undulation. Undulation pitches of approximately 0.5 to 1.5 mm and rises of 0.2 to 1 mm can be provided for example.

According to a variant, the reflector is truncated in its lower part: it is thus possible to have a reflector of smaller size, making it possible to have a more compact optical module without being significantly penalised optically by the gain in efficiency obtained with the additional optical element according to the invention.

The shield can be a movable shield making it possible to produce a dual-function or multi-function headlight, in particular a low-beam/high-beam dual-function module or a multi-function module.

The optical module according to the invention can emit at least one type of beam with a cut-off amongst those described at the beginning of the present text.

The invention also concerns a motor vehicle headlight equipped with at least one optical module as described above.

The invention will be detailed hereinafter with the help of a non-limiting example illustrated by the following figures:

Other objects and advantages of the invention will be apparent from the following description, the accompanying drawings and the appended claims.

DESCRIPTION OF THE PREFERRED EMBODIMENTS

The elements appearing in different figures keep the same references.

Figure 1:
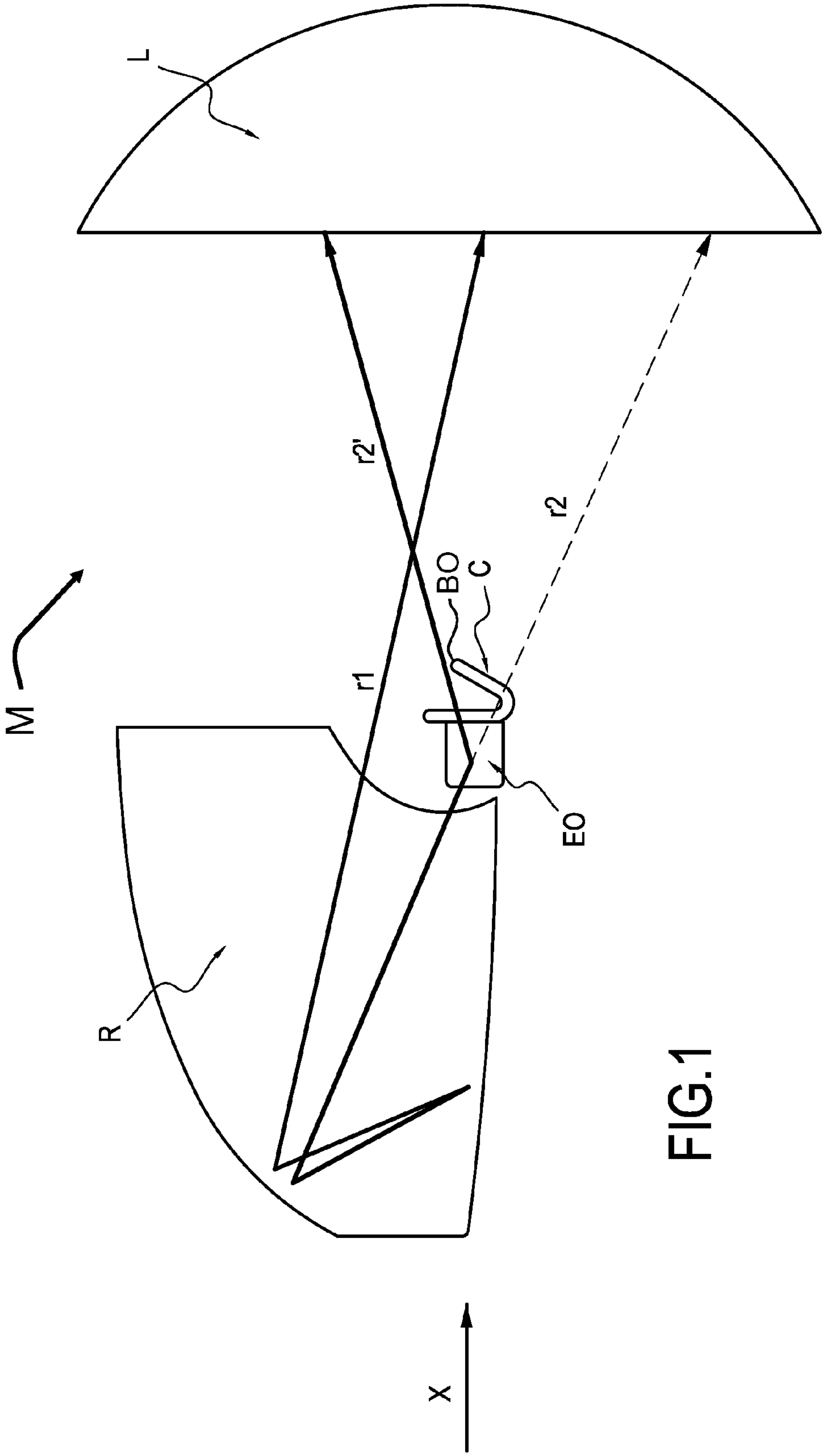
FIG. 1: a view in cross-section along a vertical plane of an optical module according to the invention.
Figure 2:
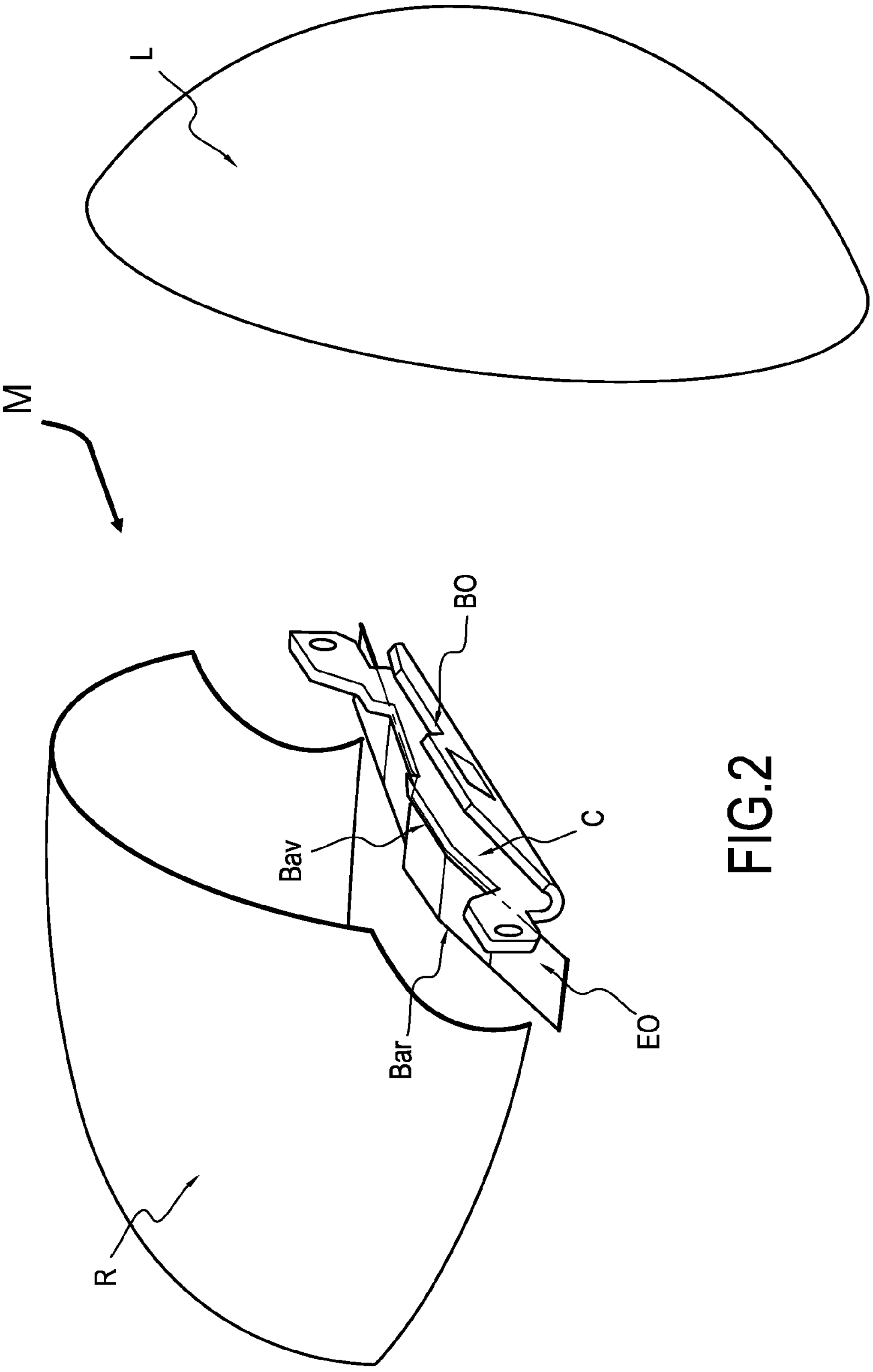
FIG. 2: a view in perspective of the module according to FIG. 1.

FIGS. 1 and 2 show the various main elements making up the optical module M according to the invention. The module comprises:

- a reflector R, of which the geometrical shape of the reflective wall turned towards the front is close to a semi-ellipsoid. The figure depicts a reflector truncated in its lower part. An alternative is to use a "complete" reflector, the shape of which would be close to a complete ellipsoid;
- a light source S, not depicted, disposed at the back of the reflector R in a known manner. This can be a halogen bulb, a xenon bulb, or one or more light-emitting diodes. For example, it is a halogen bulb, which is situated at the internal focus of the reflector;
- a dioptric element, such as a convergent lens L (which can be of Fresnel type), which is situated at the second focus of the reflector;
- a fixed shield C, whose optically active edge BO (FIG. 2) is the margin of the shield in its upper part. This edge is chosen here to delimit a low-beam type beam, with an oblique cut-off at 15° conforming to European regulations;
- an additional optical element EO is disposed between the reflector R and the shield C. This is an element in the form of a plate whose front edge Bav (FIGS. 3A-3C) is placed next to the optically active edge of the shield C, and which is substantially flat (with different variants described later): it has a face turned upwards which is reflective. This element is mechanically fixed to the shield C, or can form an integral part thereof. The shield C and the optical element EO are both made of metal. They can also be made of a polymer-based material provided that it is chosen to be sufficiently heat-resistant and that the optical element can be metallised on at least one of its faces in order to make it reflective. This element will also be referred to by the term "folder" in all the present text.

The advantage of this element is more particularly illustrated in FIG. 1: taking a ray r1 emitted by the source and then reflected at the top part of the reflector, it can be seen that this ray passes above the shield to reach the lens. This ray will be included in the beam emitted overall by the module. As for the ray r2 emitted by the source, this is reflected by a slightly lower area of the reflector and, in the absence of the element EO, will be stopped by the screen: the luminous flux of this ray is therefore lost. On the other hand, if this element EO is provided, the ray r2 reaches the reflective face of the optical element EP and will be deviated upwards in the form of a ray r2', above the screen: by thus folding upwards at least some of the rays that would otherwise be intercepted by the screen, the luminous efficiency of the module is significantly improved.

Figure 3B:
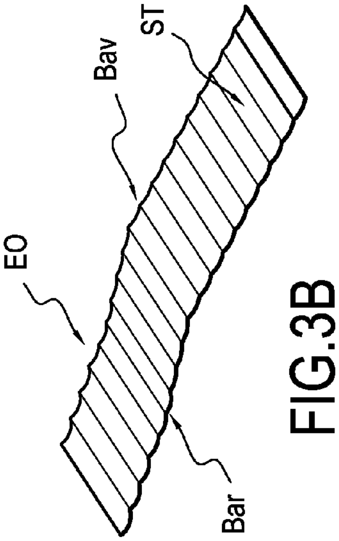
FIGS. 3A, 3B, 3C: 3 variants of the folder belonging to the optical module according to the preceding figures.
Figure 3A:
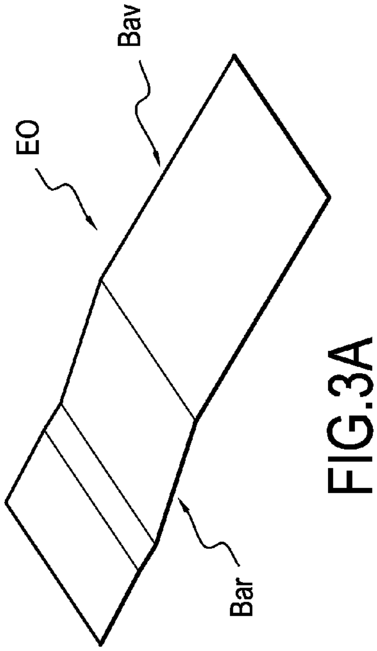
Figure 3C:
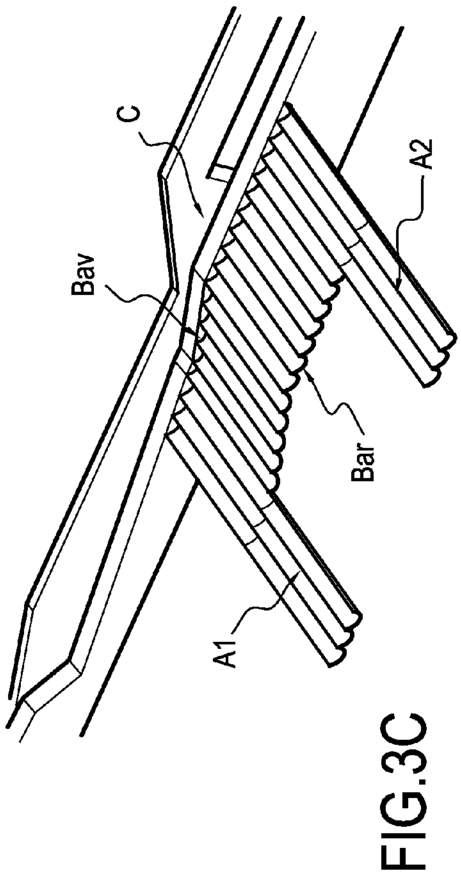

FIGS. 3A, 3B, and 3C propose variant implementations of this optical element EO, According to the variant of FIG. 3A, the optical element EO is a plate whose front edge Bav adopts the broken-line profile of the active edge of the shield C, and whose rear edge Bar is identical to and aligned with the front edge Bav. This results in an element in the form of a succession of planes inclined with respect to one another and aligned substantially along the optical axis X of the module. The depth p and the length I of this element can be modified in order to adjust as well as possible the characteristics of the rays thus "recovered" in the beam emitted by the module;

According to the variant of FIG. 3B, the optical element EO has a profile that resembles that of FIG. 3A, but ridges ST have been added on the reflective face. These ridges ST are evolutive, insofar as the front edge Bav of the element still conforms to the broken-line profile of the shield, the ridges ST arising from the front edge then evolve in such a way that the rear edge Bar of the optical element has a ridged profile. These ridges ST can be concave or convex. At the rear edge Bar, they can have an amplitude of 0.2 to 1 mm and a pitch of 0.5 to 1.5 mm. Also, alternatively or simultaneously with the presence of ridges ST, undulations may be present.

According to the variant of FIG. 3C, this again has the ridged configuration of FIG. 3B, but here the optical element EO has an indentation, with two lateral appendages A1, A2, also ridged, in the continuity of the rest of the reflective face, and which surround the source S, so as to further increase the recovery of lost rays. The dimensions of these appendages A1, A2 are variable, in particular as a function of the type and location of the source. It can also be noted from FIG. 4 that the width of the optical element EP is less than that of the active edge of the shield. The element EO is centred approximately on the middle part of the shield. It could be wider, but the additional gain in terms of flux is not very great: it is especially judicious to provide such a "folder" in the area of the shield where the arriving flux is greatest.

Figure 4A:
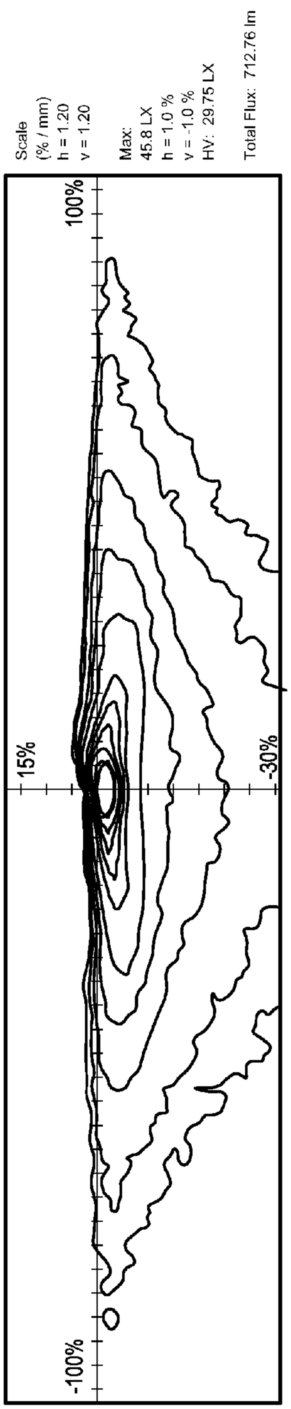
FIGS. 4A, 4B, 4C: 3 simplified views of families of isophotal curves of light beams emitted by the optical module according to the invention, illustrating the contribution of the optical element according to the variant of FIG. 3B.
Figure 4B:
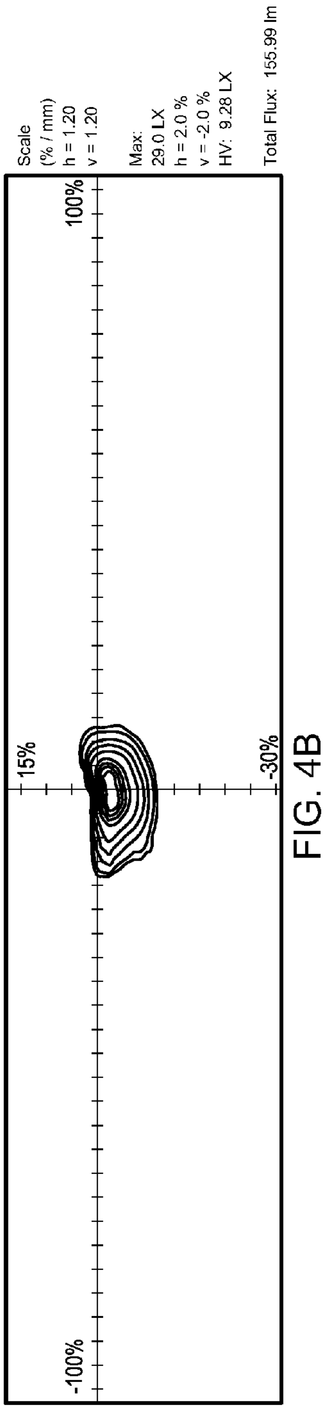
Figure 4C:
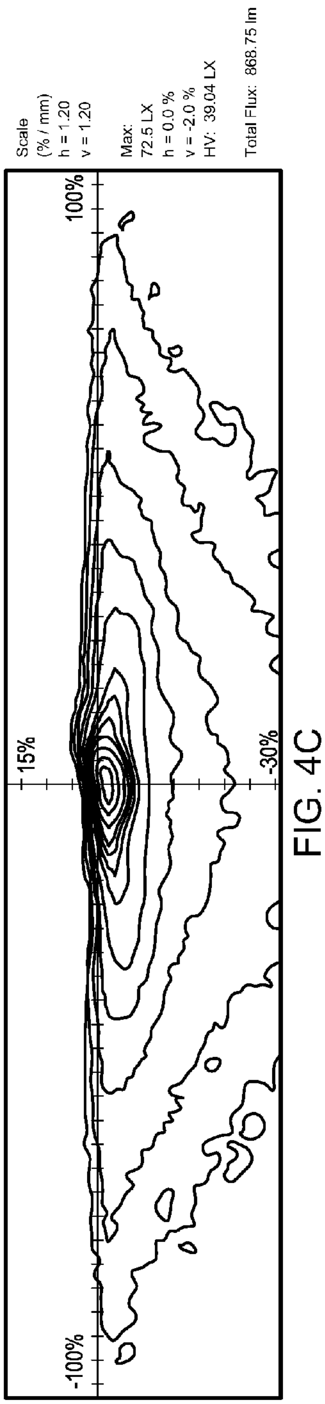

FIGS. 4A, 4B, and 4C are isophotal curves in a representation known to opticians (measured at 25 meters):

- FIG. 4A corresponds to the isophotes obtained with the module with a shield without the optical element according to the invention of FIG. 3*b* (the ridged variant).
- FIG. 4B corresponds to the isophotes obtained with the module with a shield with the optical element according to the invention, isolating the rays added into the beam owing to the presence of this optical element EO.
- FIG. 4C corresponds to the isophotes of the complete module with the optical element.

It can be deduced from these three figures that the invention makes it possible to add luminous flux into the central part of the beam: by adding the "ridged folder" according to FIG. 3B, as an illustration, a total flux of approximately 712 lumens is increased to a total flux of approximately 870 lumens, and a maximum of approximately 46 lux is increased to a maximum of approximately 72 lux.

A gain in luminous efficiency of at least 10% to 25% can thus be evaluated thanks to the presence of a "folder" according to the invention, all other things being equal. The range of the beam can also be significantly increased (maximum increased by at least 20%).

The shape of the overall beam can also be modified by the "folder", in particular it can be spread by choosing the distribution of ridges or undulations on the surface of the folder appropriately.

What is claimed is:

1. An optical module for a motor vehicle lighting device, capable of emitting at least one type of light beam having a cut-off and comprising:

- a light source disposed in a reflector;
- a dioptric element disposed in front of said reflector;
- a shield disposed between said light source and said dioptric element and having at least one optically active position where it intercepts some of the light rays emitted by said light source, said shield comprising an optically active edge suitable for forming a cut-off in a light beam emitted by the optical module, wherein an additional optical element is disposed between said light source and said shield, said additional optical element being in the vicinity of said optically active edge of the shield and having at least one reflective surface capable of redirecting, above the optically active edge of the shield, at least some of light rays that normally would have been blocked by the shield are reflected by the additional optical element above said optically active edge of the shield toward said dioptric element instead of contacting the shield when said light rays are emitted by the light source toward said shield.

2. The optical module according to claim 1, wherein the light source is placed at a first internal focus of said reflector, or in the vicinity thereof, and in that the dioptric element is placed at an external focus of the reflector or in the vicinity thereof.

3. The optical module according to claim 1, wherein the shape of said reflector is close to an ellipsoid.

4. The optical module according to claim 1, wherein said additional optical element is fixed to or forms an integral part of the shield.

5. The optical module according to claim 1, wherein said reflective surface of said additional optical element comprises a face turned upwards, a front edge of which substantially follows, at least locally, the profile of the optically active edge of said shield.

6. The optical module according to claim 5, wherein said front edge of said additional optical element is placed next to said optically active edge of said shield.

7. The optical module according to claim 5, wherein said front edge comprises a broken line.

8. The optical module according to claim 5, wherein said front edge substantially serves as a generator for the shape of said face.

9. The optical module according to claim 1, wherein said reflective surface of said additional optical element comprises a face turned upwards and disposed in the vicinity of the central part only of said shield.

10. The optical module according to claim 1, wherein said reflective surface of said additional optical element comprises a face turned upwards and provided with an indentation at its rear edge.

11. The optical module according to claim 1, wherein said reflective surface of said additional optical element comprises a face turned upwards whose rear edge has a profile close, identical or different to that of a front edge.

12. The optical module according to claim 1, wherein said reflective surface of said additional optical element comprises a face turned upwards comprising a skew surface.

13. The optical module according to claim 1, wherein said reflective surface of said additional optical element comprises a face turned upwards which is smooth or which comprises, at least locally, flutes.

14. The optical module according to claim 13, wherein said flutes are substantially oriented parallel to an optical axis of said optical module.

15. The optical module according to claim 13, wherein said flutes are evolutive in shape.

16. The optical module according to claim 1, wherein said reflector is truncated in its lower part.

17. The optical module according to claim 1, wherein the shield is a movable shield, making it possible to produce a dual-function or multi-function headlight, in particular a low-beam/high-beam dual-function module or a multi-function module.

18. Motor vehicle headlight equipped with the optical module according to claim 1.

19. A motor vehicle optical module comprising:

a light source disposed in a reflector;

a dioptric element disposed in front of the reflector;

a shield situated between said light source and said dioptric element, said shield comprising an optically active edge suitable for forming a cut-off in a light beam emitted by said light source; and a second optical element situated between said light source and said shield for redirecting at least some of light rays that normally would have been blocked by the shield are reflected by the second optical element above said optically active edge of the shield toward the dioptric element instead of contacting the shield when the light rays are emitted by said light source toward said shield above or past said optically active edge.

20. The motor vehicle optical module as recited in claim 19 wherein said second optical element is secured directly to or integral with said shield.

21. The motor vehicle optical module as recited in claim 19 wherein said second optical element comprises a front face situated adjacent to said optically active edge.

22. The motor vehicle optical module as recited in claim 19 wherein said second optical element comprises at least one of a smooth face, ridges, undulations or flutes.

23. The motor vehicle optical module as recited in claim 22 wherein said ridges or undulations are substantially parallel to an optical axis of said motor vehicle optical module.

24. The motor vehicle optical module as recited in claim 19 wherein said second optical element is not coupled to or integrated with said reflector and is situated adjacent to said shield.

* * * * *